April 17, 1934. C. P. KOVÁCS 1,955,133
ROTARY FREQUENCY AND PHASE CONVERTER
Filed June 6, 1933 4 Sheets-Sheet 1

Witnesses:

Inventor:
Charles Paul Kovács

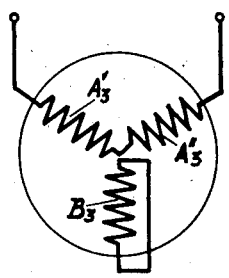
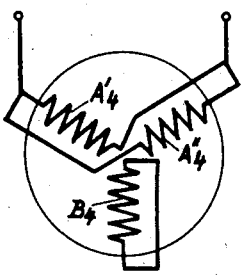
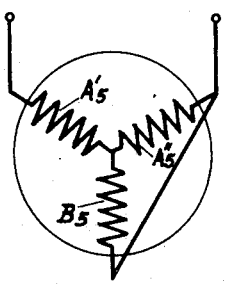
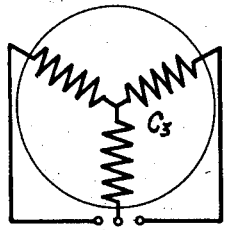
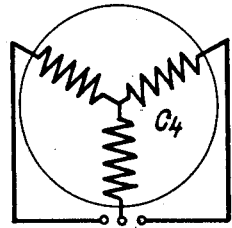
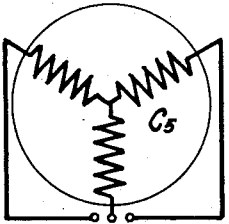
fig.3.  fig.4.  fig.5.
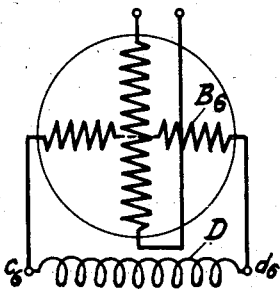
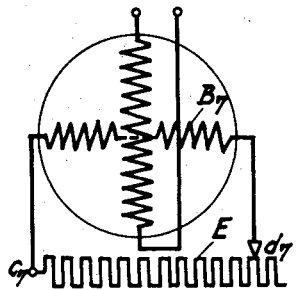
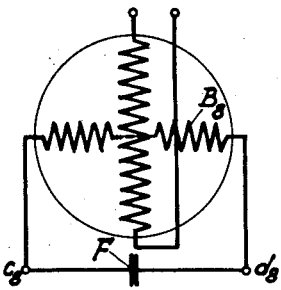
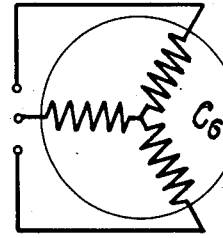
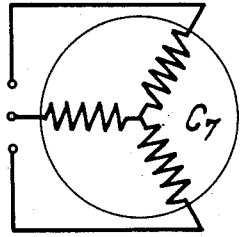
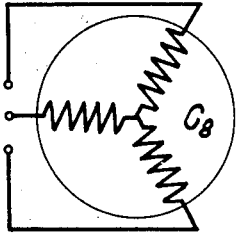
fig.6.  fig.7.  fig.8.

April 17, 1934.  C. P. KOVÁCS  1,955,133
ROTARY FREQUENCY AND PHASE CONVERTER
Filed June 6, 1933   4 Sheets-Sheet 4

Patented Apr. 17, 1934

1,955,133

UNITED STATES PATENT OFFICE 1,955,133

ROTARY FREQUENCY AND PHASE CONVERTER

Charles Paul Kovács, Budapest, Hungary

Application June 6, 1933, Serial No. 674,518

10 Claims. (Cl. 172—281)

My invention refers to a rotary converter suitable for converting single-phase alternating current into three-phase, respectively multi-phase alternating current of double frequency, as well as for converting three-phase, respectively multi-phase alternating currents into single-phase alternating current of half frequency.

In the motor generators heretofore in use for this purpose both the driving motor and the dynamo had to be dimensioned to the full load of converted power.

In contradistinction to this the converter forming the subject of my invention transmits half the power by electricity directly from the primary current supply, the other half being transmitted in the form of mechanical energy through a driving motor of synchronous speed which arrangement enables the driving motor to be dimensioned only to half the power to be converted.

Figure 1:
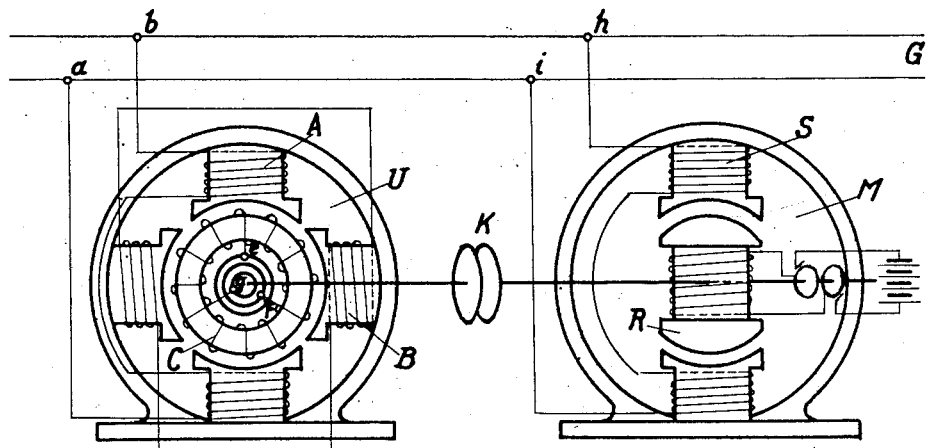
Figure 2:
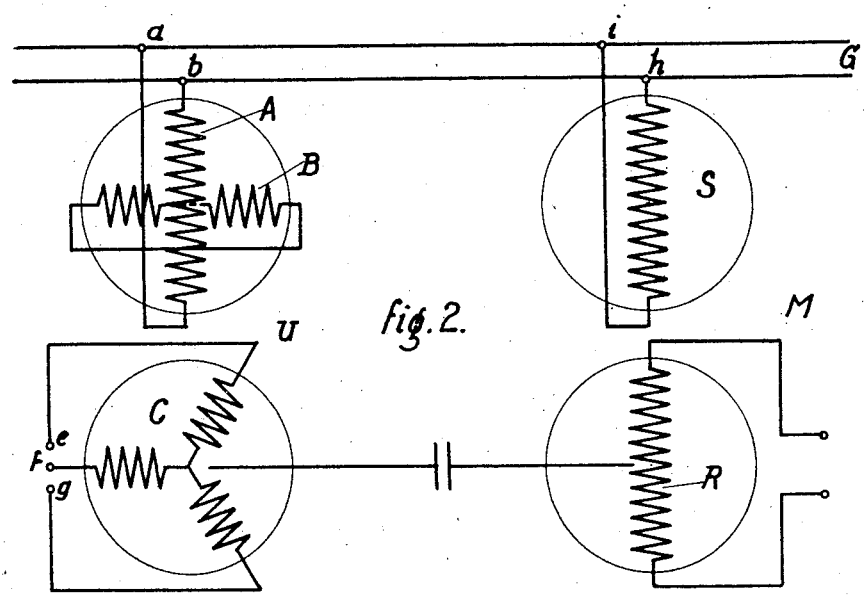
Figure 9:
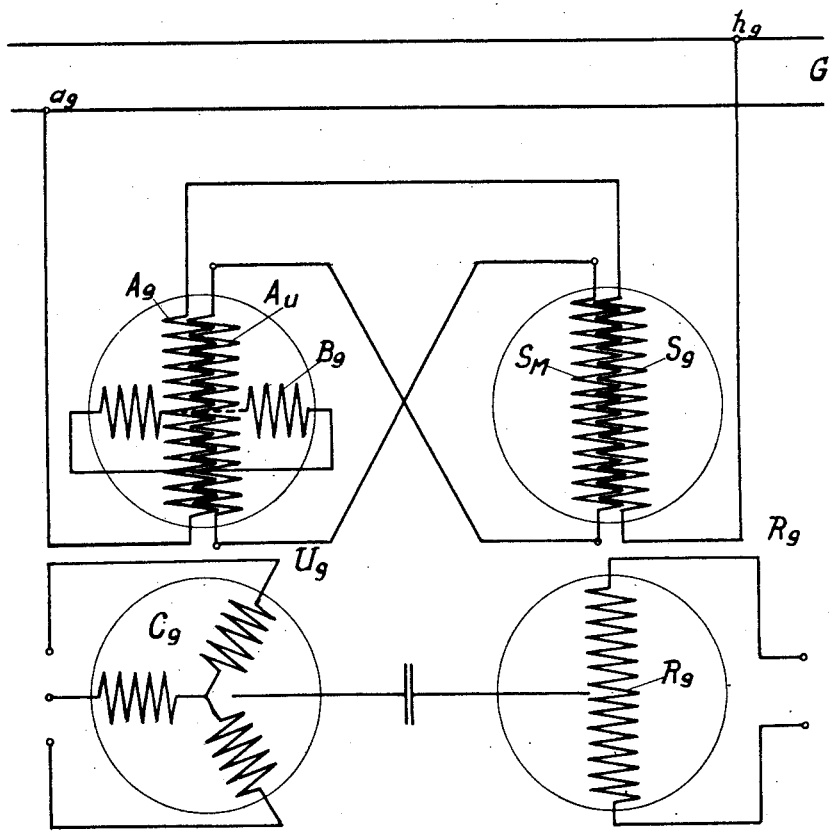
Figure 10:
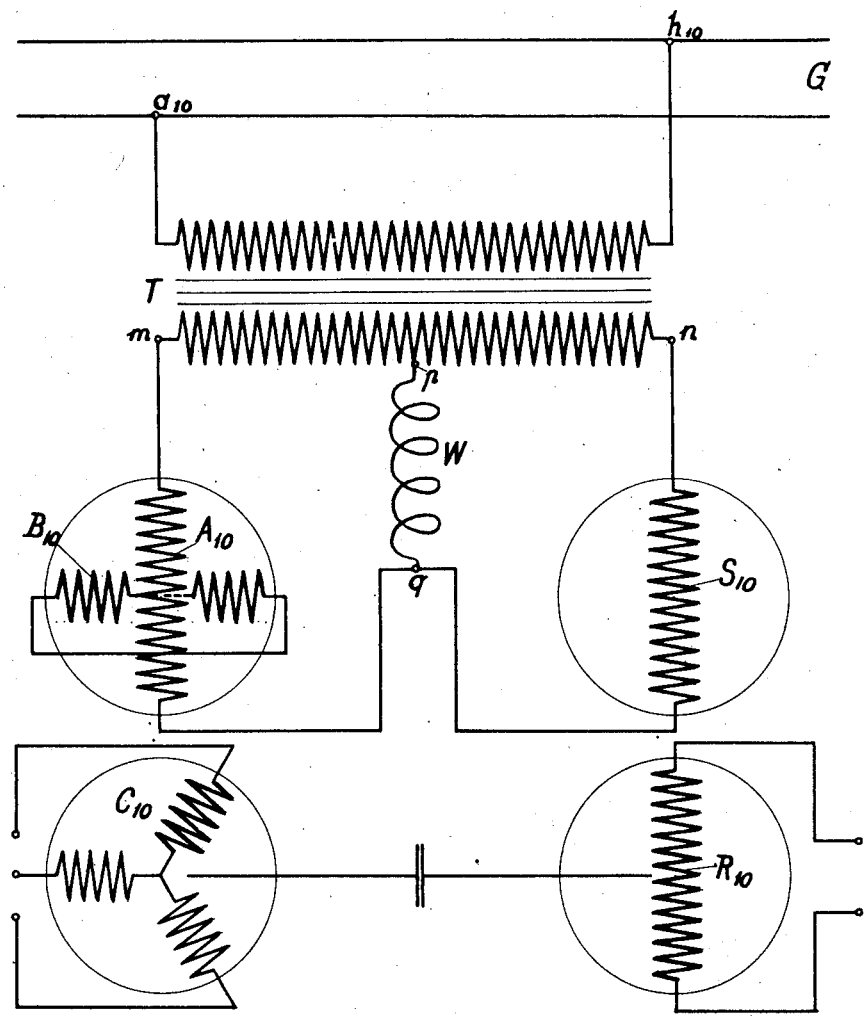

On the drawings:

Figure 1 represents a synchronous motor driven converter set,

Figure 2, a diagram showing the principle of this set,

Figs. 3–8 show various types of the windings and of the connections of the stator of the converter, Figs. 9–10 represent types where the stators of the rotor and the converter are electrically connected with each other by an auxiliary regulating circuit.

In the example shown in Fig. 1 the converter set consists of the synchronous motor M, of the converter proper U, and of the mechanical connection K between their shafts. As seen in Figs. 1 and 2, the synchronous motor M is provided with the usual direct-current magnet rotor R and with a single-phase stator winding S, connected to the single-phase current supply G, while the slots of the laminated steel stator of the converter U receive the single-phase winding A connected to the single-phase current supply G through the terminals $a$—$b$, further the short-circuited winding B, standing electrically at or nearly at right angles to the winding A. The windings A—B we shall call for brevity "primary part" in the following. The laminated steel rotor of the converter U carries the multiphase, for example three-phase winding C, called in the following "secondary part", and provided with the slip ring connections $e, f, g$.

The working of the converter may be described as follows:

If the primary and secondary parts are run at, or nearly at the synchronous speed defined by the frequency of the single-phase current and the number of poles, the secondary winding C when electrically loaded will tend to produce a so called cross-field. The development of this cross-field is stopped by the short-circuited and also cross-wise located winding B of the primary part and so the single-phase pulsating field generated in the converter U, respectively the two oppositely rotating component field-vectors substituting this pulsating field remain intact.

With regard to the fact that the primary and secondary parts are kept running at synchronous speed to each other, of the two oppositely rotating field vectors the one rotating with the rotor will not be intersected by the conductors of the secondary part, while the other component rotating against the rotor, and having thus double relative speed, will induce in the secondary winding the double frequency multi-phase alternating current already mentioned, the number of phases of which depend on the number of phases of the secondary part.

Figs. 3, 4 and 5 are diagrams showing the arrangement of three varieties in which the usual types of three-phase motors are used for converters. $A'_3$—$A''_3$, $A'_4$—$A''_4$, and $A'_5$—$A''_5$ respectively denote in each case two windings of the three-phase winding supplied with single-phase current; $B_3$, $B_4$ and $B_5$ are short-circuited windings replacing the winding of the third phase of the three-phase winding. In Fig. 3 the windings $A'_3$—$A''_3$ are connected in series, in Fig. 4 $A'_4$—$A''_4$ are in shunt, while in Fig. 5 $A'_5$—$A''_5$ are in series with regard to each other, and the latter is connected to the short-circuited winding $B_5$ in such a manner, that $A'_5$—$A''_5$ will have different phases. $A'_3$—$A''_3$, $A'_4$—$A''_4$ besides $A'_5$—$A''_5$ are wound with regard to each other in a way to make the vector of the resultant ampere-windings perpendicular to the vector of $B_3$, $B_4$ and $B_5$ respectively. In case of three-phase current the secondary parts $C_3$, $C_4$ and $C_5$ respectively will be thoroughly identical with winding C shown in Fig. 2.

Figs. 6, 7 and 8 are diagrams of another three varieties in which the terminals $c_6$—$d_6$, $c_7$—$d_7$ and $c_8$—$d_8$ of the windings $B_6$, $B_7$ and $B_8$ instead of being short-circuited are connected through the constant or variable inductive resistance D, through the ohmic resistance E, respectively through the capacitative resistance F, whereby the voltage of the three- or multi-phase part may be regulated.

The secondary parts $C_6$, $C_7$ and $C_8$ are in case of three-phase current again identical with the winding C of Fig. 2.

In the examples shown in Figs. 9 and 10 the windings $A_9$ respectively $A_{10}$ of the converter are connected into the same circuit with the windings $S_9$ respectively $S_{10}$ of the stator of the synchronous motor, as seen in Fig. 9, where they are connected directly to the points $a_9$—$h_9$ of the current supply G, or else as shown in Fig. 10, where they are connected through a transformer T unto points $a_{10}$—$h_{10}$, corresponding to the above mentioned points of junction. As it may be seen from Fig. 9, each of the windings $A_9$—$S_9$, connected in series, is wound together with another winding $A_u$—$S_M$ respectively, the latter being connected again in series with regard to each other in a manner to promote the exciting of the windings $A_9$—$S_9$ by the current induced in windings $A_u$—$S_M$ as in a separate circuit, closed in itself. According to Fig. 10 an intermediate point $p$ of the secondary winding of the transformer T is also connected to the point $q$ between the windings $A_{10}$—$S_{10}$ through branch W.

Supposing that the separate circuit represented by windings $A_u$—$S_M$ in Fig. 9, and the branch connection $p$—$q$ in Fig. 10 are omitted, the remaining equipments of both figures will differ only in the presence of the transformer T in Fig. 10 which is no essential difference from the point of the working of these simplified converters. The arrangements remaining after the above described omissions may therefore be investigated together.

The first fact in this investigation is that the whole voltage between points $a_9$—$h_9$, respectively $a_{10}$—$h_{10}$ will be divided into two component voltages between $A_9$—$S_9$ respectively $A_{10}$—$S_{10}$. The sum of these partial voltages being invariably predetermined by the external voltage, the variation (increase or decrease) of one partial voltage results in the variation of the other partial voltage in the opposite sense (decrease or increase thereof). Of these the partial voltage accruing to, or thus the magnetic flux being present in the synchronous motor may be regulated in a very simple manner by the variation of the excitation of the rotor windings $R_9$ respectively $R_{10}$; through this variation therefore the excitation of the converter may also be easily influenced.

This provides a way for the regulation of the excitation of the converter, and thereby of the voltage of the current produced by the converter by very simple means. Considering, however, that a regulation of this kind would be too sensitive, it appeared necessary to complete this investigated arrangement with the parts omitted in the preceding, that is with the separate circuit made up from windings $A_u$—$S_M$ in Fig. 9, and with the branch connection W between points $p$—$q$ in Fig. 10. In such cases, when during regulation the partial voltages between $A_9$—$S_9$ respectively $A_{10}$—$S_{10}$ are not equal, a compensating current will flow through the separate circuit $A_u$—$S_M$ in Fig. 9, respectively through the branch W between $p$—$q$ in Fig. 10, which current reduces the excessive sensitiveness of the regulation according to dimensioning, so far as necessary in a practical case.

The degree of regulation itself may be influenced by known means such as by ohmic or inductive resistances inserted into the compensating circuit or by varying the position of the point $p$ in Fig. 10, or in many other similar ways.

The rotor and the stator may be interchanged in these converters, thus putting the single-phase winding and the short-circuited winding i. e. the primary part upon the rotor, while the multiphase, double frequency current will be taken from the stator, as secondary part.

In all the alternatives described in the preceding, as well as in every other case belonging hereto the direction of the flow of the energy transmitted may be reversed, so that e. g. one half of the energy of the three-phase alternating current introduced as primary current through the terminals $e, f, g$ shown in Figs. 1 and 2, may be supplied to the secondary single-phase mains G from the converter directly through the terminals $a$—$b$, and the other half through the shaft, respectively through the terminals $i$—$h$ of the synchronous motor.

Accordingly my converter is suitable for converting three-phase, respectively multi-phase alternating current into single-phase current of half frequency.

While I have herein shown and described a certain number of exact arrangements according to my invention, I do not desire to be limited to these only but seek to cover in the appended claims all those possibilities which come within the true spirit and scope of my invention.

What I claim as new and desire to secure by Letters Patent of the United States, is:—

1. Alternating-current rotary frequency and phase converter, comprising a single-phase synchronous motor as driving part and a multi-phase generator as driven part, the exciting part of said multi-phase generator having a single-phase exciter winding and an induced winding forming a separate circuit located at approximately 90° electrically to the axis of the single-phase exciting field.

2. Alternating current rotary frequency and phase converter, comprising a single-phase synchronous motor as driving part and a multi-phase generator as driven part, the exciting part of said multi-phase generator having a single-phase exciter winding and a short-circuited induced winding located at approximately 90° electrically to the axis of the single-phase exciting field.

3. Alternating current rotary frequency and phase converter, comprising a single-phase synchronous motor as driving part and a multi-phase generator as driven part, the exciting part of said multi-phase generator having a single-phase exciter winding and an induced winding connected to a resistance and located at approximately 90° electrically to the axis of the single-phase exciting field.

4. Alternating current rotary frequency and phase converter, comprising a single-phase synchronous motor as driving part and a multi-phase generator as driven part, the exciting part of said multi-phase generator having a single phase exciter winding and an induced winding connected to a variable resistance and located at approximately 90° electrically to the axis of the single-phase exciting field.

5. Alternating current rotary frequency and phase converter, comprising a single-phase synchronous motor as driving part and a three-phase generator as driven part, the exciting part of said three-phase generator having three coils of a normal three-phase rotary engine winding, one coil of which is closed in itself, whilst the other two coils are connected together to the single-phase current supply in a manner to create a resulting exciting field at approximately 90° electrically to said coil closed in itself.

6. Alternating current rotary frequency and phase converter, comprising a single-phase synchronous motor as driving part and a three-phase generator as driven part, the exciting part of said three-phase generator having three coils of a normal three-phase rotary engine winding, one coil of which is closed in itself, whilst the other two coils are connected in series to the single-phase current supply in a manner to create a resulting exciting field at approximately 90° electrically to said coil closed in itself.

7. Alternating current rotary frequency and phase converter, comprising a single-phase synchronous motor as driving part, and a three-phase generator as driven part, the exciting part of said three-phase generator having three coils of a normal three-phase rotary engine winding, one coil of which is closed in itself, whilst the other two coils are connected parallel to the single-phase current supply in a manner to create a resulting exciting field at approximately 90° electrically to said coil closed in itself.

8. Alternating current rotary frequency and phase converter, comprising a single-phase synchronous motor as driving part and a multi-phase generator as driven part, the exciting part of said multi-phase generator having a single-phase exciter winding connected in series with the single-phase winding of the synchronous motor, an induced winding forming a separate circuit located at approximately 90° electrically to the axis of the single-phase exciting field, and a further winding wound together with said exciter winding and connected to a similar winding wound together with the single-phase winding of the synchronous motor.

9. Alternating current rotary frequency and phase converter, comprising a single-phase synchronous motor as driving part and a multi-phase generator as driven part, the exciting part of said multi-phase generator having a single-phase exciter winding connected in series with the single-phase winding of the synchronous motor and an induced winding forming a separate circuit located at approximately 90° electrically to the axis of the single-phase exciting field, said single-phase windings connected in series being fed by a single-phase transformer, from an intermediate point of the secondary winding of which a branch leads to the connection of said single-phase motor and generator windings.

10. Alternating current rotary frequency and phase converter, comprising a single-phase synchronous motor as driving part and a multi-phase generator as driven part, the exciting part of said multi-phase generator having a single-phase exciter winding connected in series with the single-phase winding of the synchronous motor and an induced winding forming a separate circuit located at approximately 90° electrically to the axis of the single-phase exciting field, said single-phase winding connected in series being fed by a single-phase transformer, from a variable intermediate point of the secondary winding of which a branch leads to the connection of said single-phase motor and generator windings.

CHARLES PAUL KOVÁCS.